United States Patent [19]

Dimon

[11] Patent Number: 4,459,480

[45] Date of Patent: Jul. 10, 1984

[54] USE OF PULSED NEUTRON LOGGING TO EVALUATE PERFORATION WASHING

[75] Inventor: Carl A. Dimon, Lancaster, Tex.

[73] Assignee: Mobil Oil Corporation, New York, N.Y.

[21] Appl. No.: 327,335

[22] Filed: Dec. 4, 1981

[51] Int. Cl.³ .............................................. G01V 5/10
[52] U.S. Cl. .................................... 250/269; 166/312
[58] Field of Search ................ 250/269, 270; 166/250, 166/312

[56] References Cited

U.S. PATENT DOCUMENTS

| | | | |
|---|---|---|---|
| 3,558,888 | 1/1971 | Youmans | 250/269 |
| 3,628,011 | 12/1971 | Wyman | 376/167 |
| 3,838,279 | 9/1974 | Schultz et al. | 250/270 |
| 4,046,197 | 9/1977 | Gruesbeck, Jr. et al. | 166/305 R |
| 4,281,712 | 8/1981 | Murphy et al. | 166/250 |

OTHER PUBLICATIONS

The Thermal Decay Time Log, Schlumberger, Log Interpretation, vol. 1-Principles, 1972 Edition, pp. 61-68.

*Primary Examiner*—Janice A. Howell
*Assistant Examiner*—Constantine Hannaher
*Attorney, Agent, or Firm*—A. J. McKillop; M. G. Gilman; J. F. Powers, Jr.

[57] ABSTRACT

An improved method of locating and measuring voids behind casings of wells in unconsolidated formations is disclosed featuring first and second logging operations carried out before and after perforation washing respectively to locate voids. The voids may thereafter be filled using conventional gravel packing techniques. In a preferred embodiment pulsed neutron logging is the logging tool chosen, and a washing fluid having a high neutron absorption cross-section is used.

7 Claims, 4 Drawing Figures

USE OF PULSED NEUTRON LOGGING TO EVALUATE PERFORATION WASHING

FIELD OF THE INVENTION

This invention relates to evaluation of the efficacy of perforation washing operations as performed in oil or gas wells drilled in unconsolidated formations. More particularly, the invention relates to the use of pulsed neutron logging techniques before and after perforation washing operations are performed to evaluate the degree of success of the perforation washing operations.

BACKGROUND AND OBJECTS OF THE INVENTION

Wells in unconsolidated formations such as those found in the Gulf of Mexico, are known to have certain sand production problems. For example, the fact that the formations are unconsolidated requires that each well is "cased" with a tubular steel casing and that the casing be then sealed to the formation by pumping cement down around the casing. Thereafter, the well is "perforated" at selected depths, typically by using an explosive charge and projectile to create perforations through both the steel casing and the cement into the formation wherein hydrocarbons are believed to be present. Washing of the perforation by pumping of a completion fluid, such as a "weighted" brine having a higher specific gravity than the fluids contained in the formation, down a work string, and through a perforation wash tool and finally out through the perforations removes debris from the areas of the perforations and may create a void in the unconsolidated sand-like formation behind the cement sheath. It is then common practice to pump "gravel" slurries down the hole and out through the perforations to fill the perforations and any such voids. ("Gravel" is used here, as usual in the art, to refer to a more coarse sand than that typically found in the formation.) The gravel then fills the perforations and any voids and restricts the movement of the finer formation sand behind the cement and the casing.

It is necessary to know what quantity of voids are to be filled by the gravel in order to evaluate the amount of gravel required. In order that the amount of void space to be filled by gravel can be known, the amount of voids created by the perforation washing with brine also must be known. There is at present no completely satisfactory technique for measuring the amount and size of these voids.

It is accordingly an object of the invention to provide a method for evaluating the quantity and size of voids formed during perforation washing.

A broad object of the invention is to provide a means for better evaluating the behind-casing configuration of void space.

Still another object of the invention is to provide improved methods of well completion, whereby an improved well will result.

SUMMARY OF THE INVENTION

The above needs of the art and objects of the invention are satisfied by the present invention according to which well logging operations of a type designed to respond to the difference between a formation immediately behind the sheath and voids in the formation are performed both before and after the perforation washing operation. Differences between the two resulting logs are then indicative of voids created by perforation washing. In a preferred embodiment, pulsed neutron logging is used as the logging technique, while a weighted brine having a high absorption cross-section to pulsed netrons is used as the perforations washing fluid. Accordingly, the detection of voids is optimized and results are of high reliability.

BRIEF DESCRIPTION OF THE DRAWINGS

The invention will be better understood if reference is made to the accompanying drawings, in which.

DESCRIPTION OF THE PREFERRED EMBODIMENTS

Figure 1:
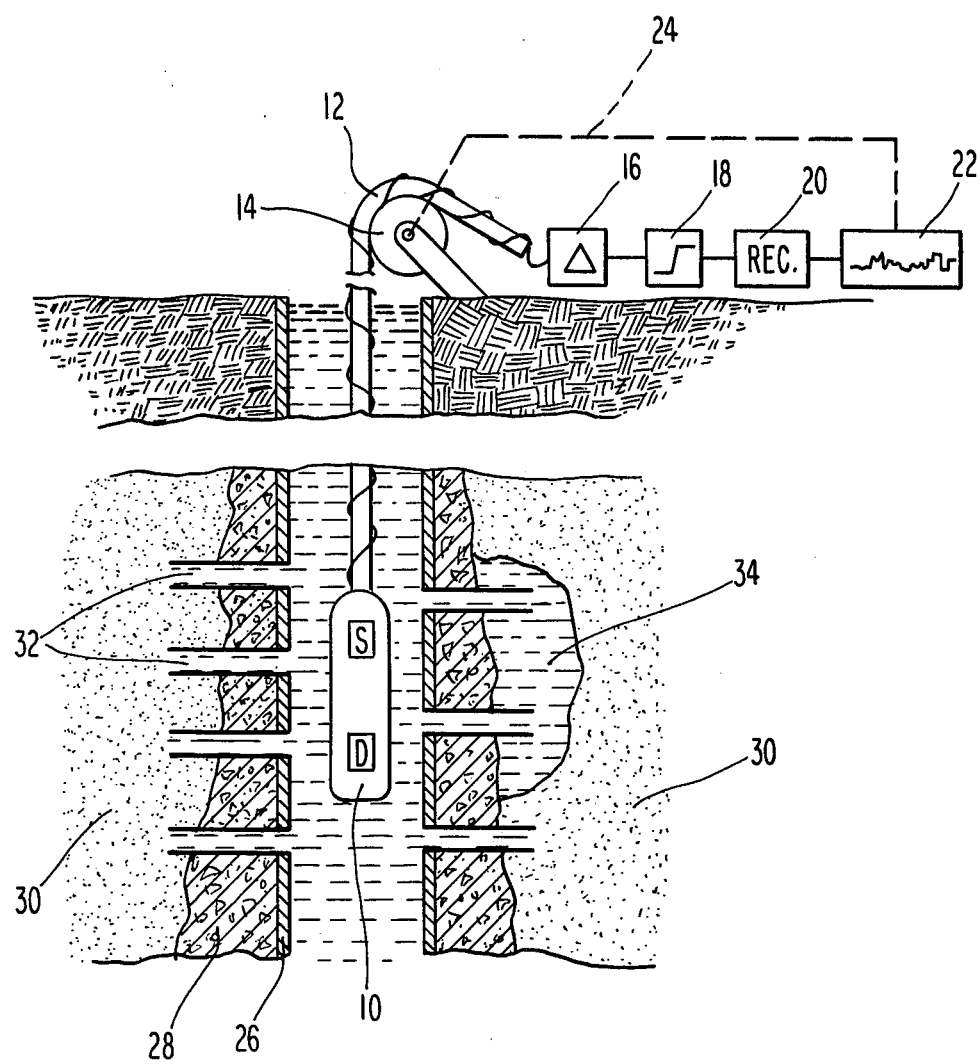
FIG. 1 shows the logging operation in a well.

As described above, new wells in areas where the formation is an unconsolidated sandstone formation such as off-shore Louisiana may be completed initially by usng an inside-casing gravel pack. Non-damaging clean, filtered brines made from e.g. $CaCl_2$, $CaBr_2$, and $ZnBr_2$ are used as completion fluids; that is to say, prior to gravel packing, the perforations formed by explosion operations are washed with these fluids which remove gun debris from the perforation tunnel. However, washing can create a void space behind the cement sheath. The void usually is packed with gravel to prevent sand movement in the formation during production. It is important to measure the volume and geometry of these voids prior to gravel packing. According to the present invention, logs, preferably pulsed neutron logs are run before and after perforation washing and the results are compared to determine where voids are located and their size so that the gravel packing operation can be accurately performed.

Pulsed neutron logs are often run in cased holes to locate oil/water or gas/water interfaces in the formation. Such operations are usually performed immediately before perforating the well; the resulting log would indicate well bore conditions before perforation washing. According to the present invention, a similar log is run after washing, and the results compared to indicate the formation of voids during washing. Two suitable pulsed netron logs are Schlumberger's Thermal Decay Time (TDT) log and Dresser Atlas' Neutron Lifetime Log (NLL). As these names imply, these logging tools measure the rate of absorption of thermal neutrons by the formation within 2 to 5 feet of the wellbore. The rate of absorption can be expressed in terms of the "macroscopic cross-section", $\Sigma$, as follows:

$$\Sigma_{form} = \phi(S_w\Sigma_w + S_O\Sigma_O + S_g\Sigma_g) + (1-\phi)\Sigma_{rock} \qquad (1)$$

where $\Sigma_{form}$ = rate of absorption of thermal neutrons for the total formation as measured by the logging tool and converted to a macroscopic cross-section ($10^{-3}$ cm$^{-1}$)

$\phi$ = porosity (fraction)

$S_w$, $S_O$, $S_g$ = fractional saturations of water, oil and gas, respectively $\Sigma_w, \Sigma_o, \Sigma_g$ = macroscopic cross-section of formation water, oil, and gas, respectively ($10^{-3}$ cm$^{-1}$)

$\Sigma_{rock}$ = macroscopic cross-section of the rock including its sandstone clay and mineral constituents ($10^{-3}$ cm$^{-1}$) The macroscopic cross-sections for the rock and the fluids can be calculated from their presumed chemical composition. The chloride ions in formation water are a major contributor in equation (1), so the log is used to infer water saturation values.

Filtered completion brines contain the chloride ion in even higher concentrations than in formation water. Hence, if a void is created during perforation washing and filled with brine, then that region will have a high macroscopic cross-section. Algebraically, this is expressed as:

$$\Sigma_{void} = \Sigma_{brine} > \Sigma_w >> \Sigma_{form} \quad (2)$$

According to the present invention, a pulsed netron log is run before and after perforation washing. Then, if a void has been created by washing, the log signal should change in proportion to the radial thickness of the void multiplied by $\Sigma_{brine}$, as the void will have been filled with brine completion fluid. Hence, one need only know $\Sigma_{brine}$ to calculate the radial thickness of the void; this renders calculation of the void volume simple.

FIG. 1 shows the overall layout of the logging scheme used according to the present invention which is identical to that used in the prior art, e.g. according to the TDT log described above as used to locate oil/water interfaces. The logging tool 10, which broadly comprises a source S and detector D of pulsed neutrons is lowered by means of a cable 12 running over a sheave 14. The cable 12 also carries the signals output by the logging tool, which are typically amplified in an amplifier 16, filtered by filters 18 and recorded on a recorder 20, typically outputting a visual record of the total absorption cross-section on a chart 22. The operation of the chart 22 is synchronized to the lowering of the logging tool 10 as indicated by the dashed line 24.

Typically the well itself is first drilled, a steel casing 26 is then inserted, and cement 28 is pumped around the outside of the casing 26, to firmly seal the casing 26 to the formation indicated generally at 30. In particular in offshore locations the formations tend to be very loosely cemented and hence the casing 26 and the cement 28 are essential to insure that the well does not collapse. After insertion of the casing 26 and pumping of the cement 28, the well is perforated as at 32, for example, by detonation of an explosive charge deep within the well. The debris resulting from the explosion is then washed out away from the inner end of the perforations 32 by pumping of a completion fluid, typically a chloride brine, down the well hole. This washing referred to as perforation washing sometimes creates a void as at 34 in the formation 30 which is then filled with the washing fluid. If the well were thereafter put into production and gas or oil were withdrawn through the area of the void 34, movement of the formation sand 30 could collapse the casing 26, plug the perforations 32, or erode downhole or surface equipment. Accordingly it is known in the prior art to pump a larger mesh sand, referred to generally as "gravel" down the bore hole and out through the perforations 32 to fill the void 34 and the perforations 34 so as to hold back the formation 30. According to the present invention the location of these voids is determined prior to gravel packing by performing logging operations using a logging technique which responds to the characteristics of the material outside the casing. This is done both before and after the washing operation so that the voids created during washing are detected by comparing the two logs. In a particularly preferred embodiment, a pulsed neutron logging technique is used which gives a good differentiation between sands filled with formation fluids as at 30 and voids filled with completion fluid as at 34 so that the distinction is clearly brought out by comparison of the results of the logs. Logs such as the Schlumberger Co's. Thermal Decay Time Log or the Dresser Atlas Co's. Neutron Lifetime Log are suitable. These are well understood by the prior art, are commercially available and form no part of the present invention.

Figure 2:
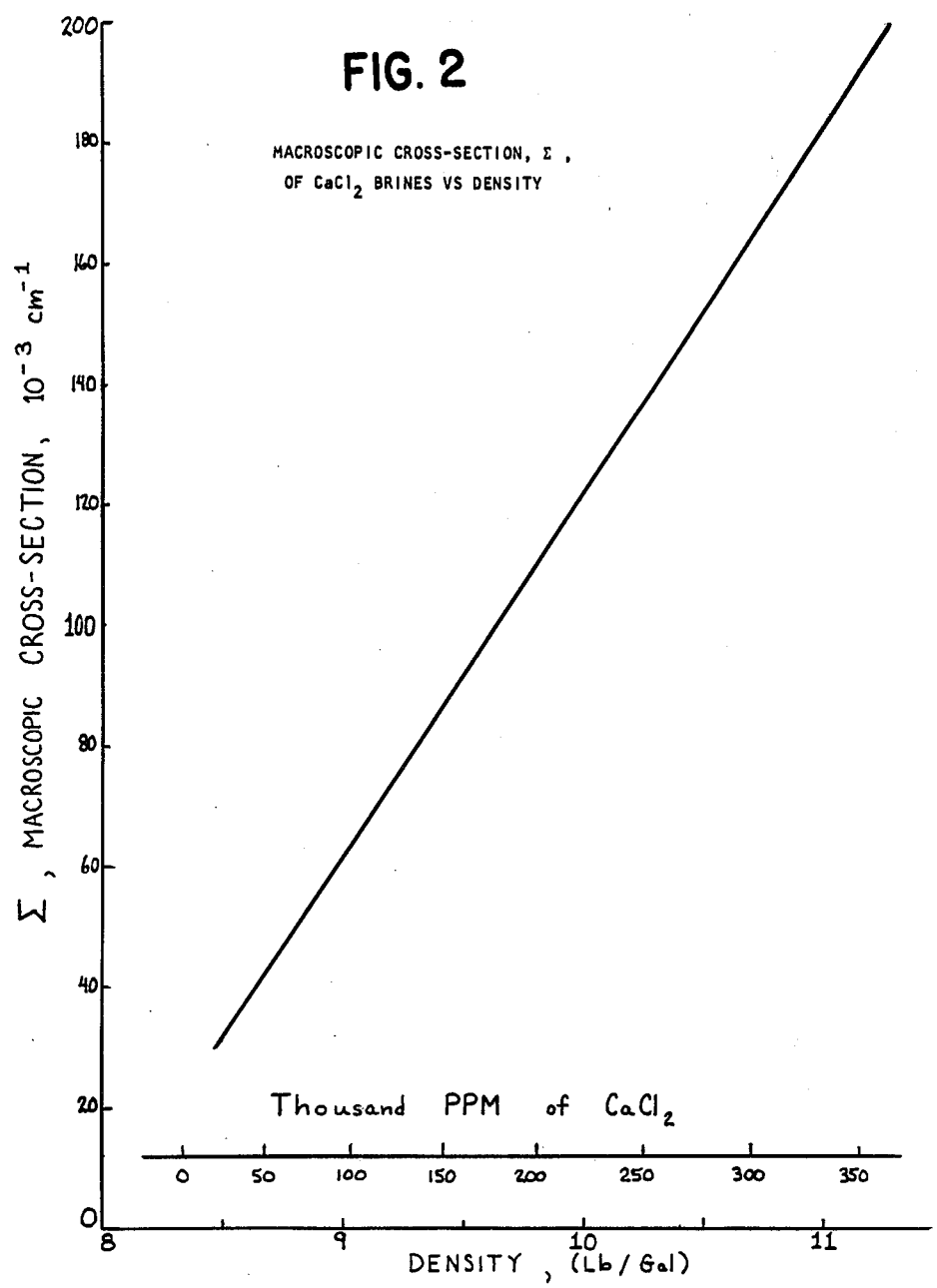
FIG. 2 graphs the macroscopic cross-section of a particular weighted brine versus density of the salt in the brine.

FIG. 2 shows the computed macroscopic cross-section of $CaCl_2$ brines, e.g., as used for perforation washing, as a function of the fluid density in lb/gal. Referring to that figure, a $CaCl_2$ brine with a density of 10.5 lb/gal has a $\Sigma$ value of $148 \times 10^{-3}$ cm$^{-1}$ and contains about 280,000 ppm or 28 weight percent of $CaCl_2$. For comparison, a typical formation water, containing 153,000 ppm of NaCl has a $\Sigma$ value of $80 \times 10^{-3}$ cm$^{-1}$. The commercially available logs mentioned above can easily distinguish between these values.

It will be appreciated that FIG. 2 shows the neutron absorption cross-section $\Sigma$ for the preferred completion brine which is desirably used so as to increase the absorption cross-section $\Sigma$ of the void with respect to the formation so as to enable a more accurate discrimination therebetween.

Moreover, FIG. 2, shows the predicted $\Sigma$ for the completion brine, which permits calculation of the void size from the log.

Figure 3:
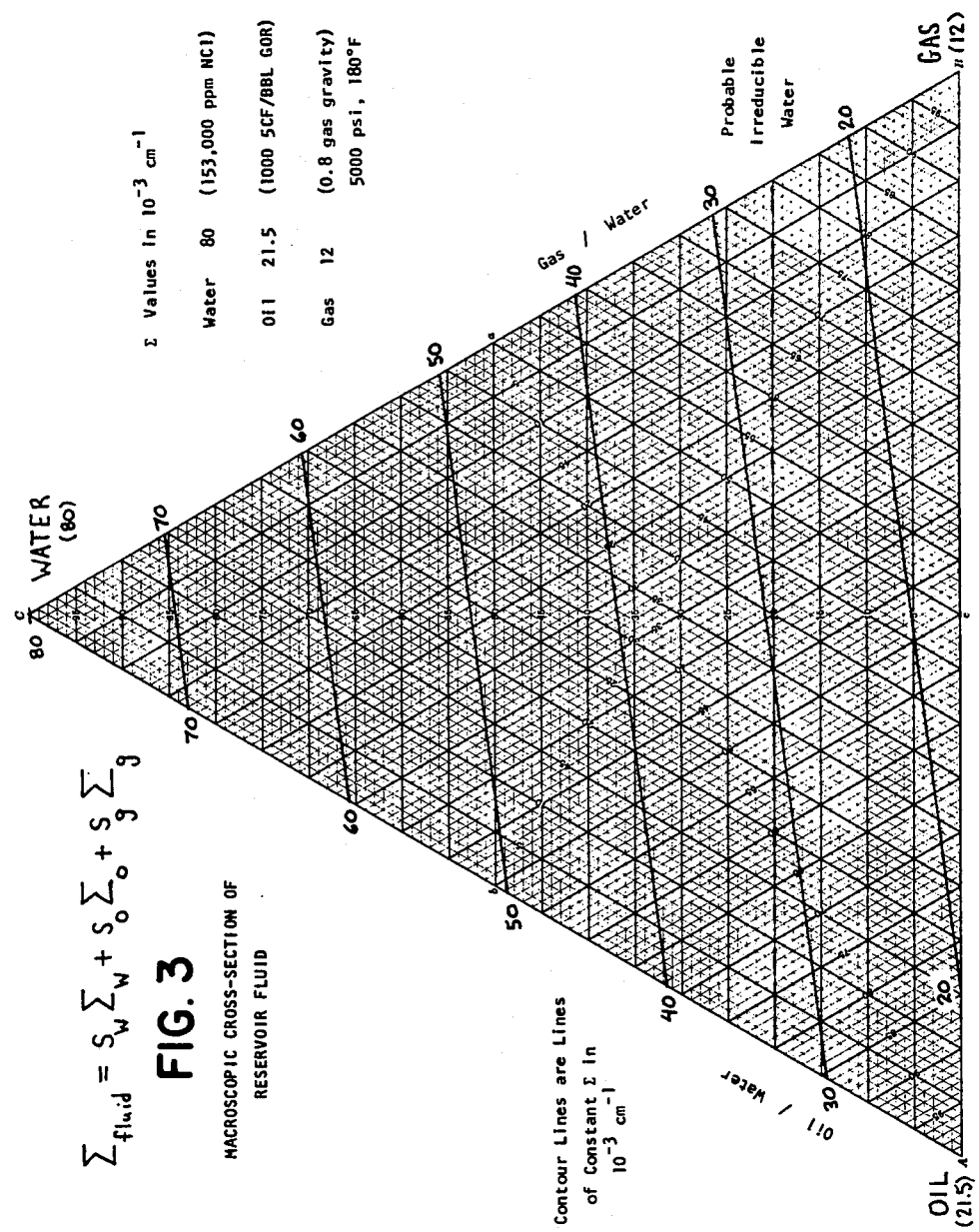
FIG. 3 shows a macroscopic cross-section of various compositions of reservoir fluid.

Similarly, FIG. 3 shows the variation in $\Sigma$ with respect to various mixtures of water, oil and gas. FIG. 3 graphs the macroscopic cross-section of the reservoir fluid in the porosity of the rock, which is defined as follows:

$$\Sigma_{fluid} = S_w \Sigma_w + S_o \Sigma_o + S_g \Sigma_g \quad (3)$$

In that figure, contour lines representing constant values of $\Sigma$ are drawn on a triangular diagram. The top vertex of the triangular corresponds to a water sand ($S_w = 100\%$). It is assumed that the salinity of the formation water is 153,000 ppm NaCl corresponding to a $\Sigma$ value of $80 \times 10^3$ cm$^{-1}$ as noted above. The base of the triangle represents no water saturation ($S_w = 0\%$). An irreducible (intersticial or connate) water saturation of 20% has been drawn on the triangular diagram for reference.

The left and right vertices of the triangle represent all oil ($S_o = 100\%$) and all gas ($S_g = 100\%$) respectively. The corresponding $\Sigma$ values are $21.5 \times 10^{-3}$ cm$^{-1}$ for oil and $12 \times 10^{-3}$ cm$^{-1}$ for gas representing a gas gravity of 0.80 at 5000 psi and 180° F. These terms defining the oil and gas are well understood in the art and represent realistic formation fluids. It will be observed that both oil and gas have low $\Sigma$ values relative to formation water.

The left side of the triangle in FIG. 3 represents an oil sand with some formation water but no gas ($S_g = 0\%$). Similarly the right side of the triangle represents a gas sand with some formation water but no oil ($S_o = 0\%$). Note that the contour lines of constant $\Sigma$ on FIG. 3 are almost flat, nearly parallel to the base of the triangle.

This indicates that the Σ value for reservoir fluids depends primarily on the water saturation and only secondarily on the oil and gas saturations.

Figure 4:
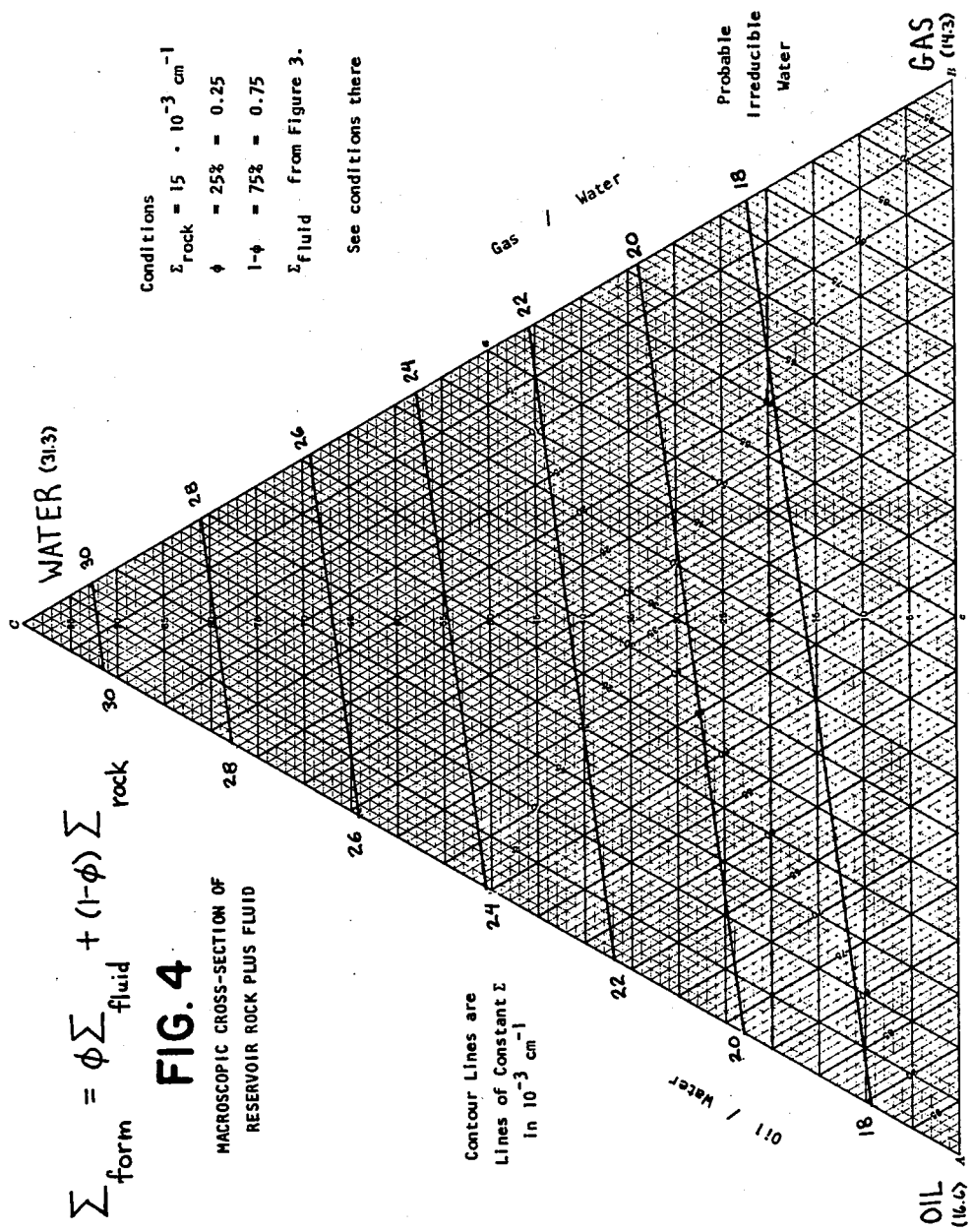
FIG. 4 shows a macroscopic cross-section of reservoir rock plus fluid.

FIG. 4 shows a similar triangular graph, showing variation in $\Sigma_{form}$—that is, Σ for the rock matrix together with the water, gas and oil—with respect to variation in water/gas/oil ratio for a constant porosity $\phi$ of 25%.

FIG. 4 shows the macroscopic cross-section of the formation including rock plus fluids and defined by $$\Sigma_{form} = \phi \Sigma_{fluid} + (1 - \phi) \Sigma_{rock} \quad (1)$$
$$= \phi (S_w \Sigma_w + S_O \Sigma_O + S_g \Sigma_g) + (1 - \phi) \Sigma_{rock}$$

Again a triangular diagram is used to present lines of constant Σ for various combinations of $S_w$, $S_O$ and $S_g$.

The fluid properties used to construct FIG. 4 are the same as those in FIG. 3. The porosity of the rock is assumed to be 25%, e.g. the rock occupies 75% of the volume. The value of Σ for the rock is taken to be $15 \times 10^{-3}$ cm$^{-1}$ corresponding to a sandstone with about 20% shale.

Again the vertices and the sides of the triangle have the same interpretation as in FIG. 3. The contour lines of constant Σ once again are nearly flat. In fact, according to equations (1) and (3), the contour lines on FIG. 4 must have the same slope as those in FIG. 3. Therefore the value of Σ is dependent primarily on the water saturation and porosity and only secondarily on the oil and gas saturation.

Referring to FIG. 4 note that the Σ value for the formation at 25-30% water saturation and 25% porosity is about $20 \times 10^{-3}$ cm$^{-1}$ for both oil and gas sands. This value is intermediate between that for the rock, $15 \times 10^{-3}$ cm$^{-1}$, and the fluid, $30-35 \times 10^{-3}$ cm$^{-1}$. The Σ value for a water sand with the same porosity and shale content is $30 \times 10^{-3}$ cm$^{-1}$.

It will be appreciated that there has been described a method whereby the voids formed during perforation washing can be measured. By comparison of the log taken before washing with that taken after, one can locate points at which the neutron absorption cross-section has increased after washing, indicating the presence of additional voids filled with brine. Moreover, the availability of numerical values for expected Σ, as given by FIGS. 2, 3 and 4 allow calculation of the actual void size as a function of the known constituents of the formation and of the completion brine.

It will be appreciated that while the pulsed neutron logs referred to above comprise the preferred tools to be used in the method of the invention, other logging techniques which would show differential values where voids were present as opposed to formation sands could also be used. Accordingly, the above description of the invention should be construed broadly and not as limited by the above exemplary disclosure but only by the following claims.

I claim:

1. A method of measuring void spaces created by perforation washing of a well of the type comprising a casing defining a bore hole in a formation in the earth, comprising the steps of:
   performing a first logging operation on said well using a neutron-absorption logging techniques capable of distinguishing between the fluid used for said perforation washing and said formation;
   performing said perforation washing using as washing fluid a fluid having a neutron absorption cross-section substantially differing from that of water and rock in said formation;
   performing a second similar logging operation; and
   comparing the results of said first and said second logging operations to identify regions containing said washing fluid as void spaces created by said perforation washing.

2. The method of claim 1 wherein said logging technique is pulsed neutron logging.

3. The method of claim 1 wherein said perforation washing is performed with a brine comprising one or more of $CaCl_2$, $CaBr_2$ and $ZnBr_2$.

4. In a method of completing a well in a formation wherein said well is drilled, encased, cemented and perforated, and debris resulting from said perforation operation is removed by perforation washing with a completion fluid, said fluid having a neutron-absorption cross-section substantially different from any water and rock present in said formation the improvement which comprises:
   performing a logging operation on said well prior to said washing, said logging operation being a neutron-absorption logging operation capable of distinguishing between the fluid used for said washing and any water or rock present in said formation;
   performing said washing operation using a completion fluid having a neutron absorption cross section substantially different from any water and rock present in said formation;
   performing a second logging operation of a type similar to said first logging operation; and
   comparing the results of said first and second logging operations to locate areas containing said completion fluid after said second logging operation, and identifying said areas as voids created by said washing operation.

5. The method of claim 4 wherein said logging operations are performed using pulsed neutron logging techniques.

6. The method of claim 5 wherein said completion washing fluid is a brine comprising one or more of $CaCl_2$, $CaBr_2$ and $ZnBr_2$.

7. The method of claim 4 comprising the additional step of packing the voids identified with gravel material.

* * * * *

UNITED STATES PATENT AND TRADEMARK OFFICE
CERTIFICATE OF CORRECTION

PATENT NO. : 4,459,480

DATED : July 10, 1984

INVENTOR(S) : CARL A. DIMON

It is certified that error appears in the above-identified patent and that said Letters Patent is hereby corrected as shown below:

Column 6, line 7, "techniques" should be --technique--.

Column 6, line 10, "performation" should read --perforation--.

Signed and Sealed this

Twenty-second Day of January 1985

[SEAL]

Attest:

DONALD J. QUIGG

Attesting Officer     Acting Commissioner of Patents and Trademarks